US008014496B2

(12) United States Patent
Schultz

(10) Patent No.: US 8,014,496 B2
(45) Date of Patent: Sep. 6, 2011

(54) SYSTEMS AND METHODS FOR PROVIDING NETWORK-BASED VOICE AUTHENTICATION

(75) Inventor: Paul T. Schultz, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1575 days.

(21) Appl. No.: 10/900,335

(22) Filed: Jul. 28, 2004

(65) Prior Publication Data

US 2006/0029190 A1 Feb. 9, 2006

(51) Int. Cl.
*H04M 1/64* (2006.01)
(52) U.S. Cl. ............... 379/88.02; 379/88.19; 379/93.03; 379/142.05; 704/231; 704/246; 704/251
(58) Field of Classification Search .... 379/88.01–88.04, 379/88.21, 93.03, 88.19, 88.2, 142.05, 142.06; 704/246–250, 233, 251, E17.001–E17.003, 704/E17.01, E17.011, E15.001, E15.002, 704/231; 370/392; 726/7, 5
See application file for complete search history.

(56) References Cited

U.S. PATENT DOCUMENTS

| | | | | | |
|---|---|---|---|---|---|
| 5,073,941 | A | * | 12/1991 | Locke | 704/233 |
| 5,517,558 | A | | 5/1996 | Schalk | 379/88 |
| 5,818,908 | A | * | 10/1998 | Kaplan | 379/88.21 |
| 5,907,597 | A | * | 5/1999 | Mark | 379/93.03 |
| 6,012,027 | A | | 1/2000 | Bossemeyer, Jr. | 704/243 |
| 6,145,083 | A | * | 11/2000 | Shaffer et al. | 726/7 |
| 6,804,647 | B1 | * | 10/2004 | Heck et al. | 704/246 |
| 7,552,467 | B2 | * | 6/2009 | Lindsay | 726/5 |
| 2002/0114333 | A1 | * | 8/2002 | Xu et al. | 370/392 |
| 2004/0066916 | A1 | * | 4/2004 | Brown et al. | 379/88.01 |
| 2005/0273333 | A1 | * | 12/2005 | Morin et al. | 704/247 |

OTHER PUBLICATIONS www.srdc.metu.edu.tr/webpage/projects/hermesProject/documents/VOICIFY.doc; Handset Normalization for Voice Authentication (Voicify); Levent Arslan et al.; (Jul. 28, 2004 print date); pp. 1-5.
SpeechWorks; "SpeechSecure from SpeechWorks"; 2002 Copyright date; 2 pages.
Nuance; "Nuance Verifier™ 3.5 Data Sheet"; 2004 Copyright date; 2 pages.
"Packet-Based Multimedia Communications Systems", International Telecommunication Union, ITU-TH.323, Jul. 2003.

* cited by examiner

*Primary Examiner* — Md S Elahee

(57) ABSTRACT

A system enables voice authentication via a network. The system may include an intelligent voice response engine operatively coupled to the network for receiving transaction or access requests from a plurality of telecommunications devices over the network. A speech recognition and verification services engine may be operatively coupled to the network and a database may be operatively coupled to the speech recognition and verification services engine for storing user voice print profiles. The speech recognition and verification services engine may receive a speaker verification call from the intelligent voice response engine and perform speaker verification on the received speaker verification call based on the stored user voice print profiles. The speech recognition and verification services engine may generate a verification score based upon results of the speaker verification.

33 Claims, 8 Drawing Sheets

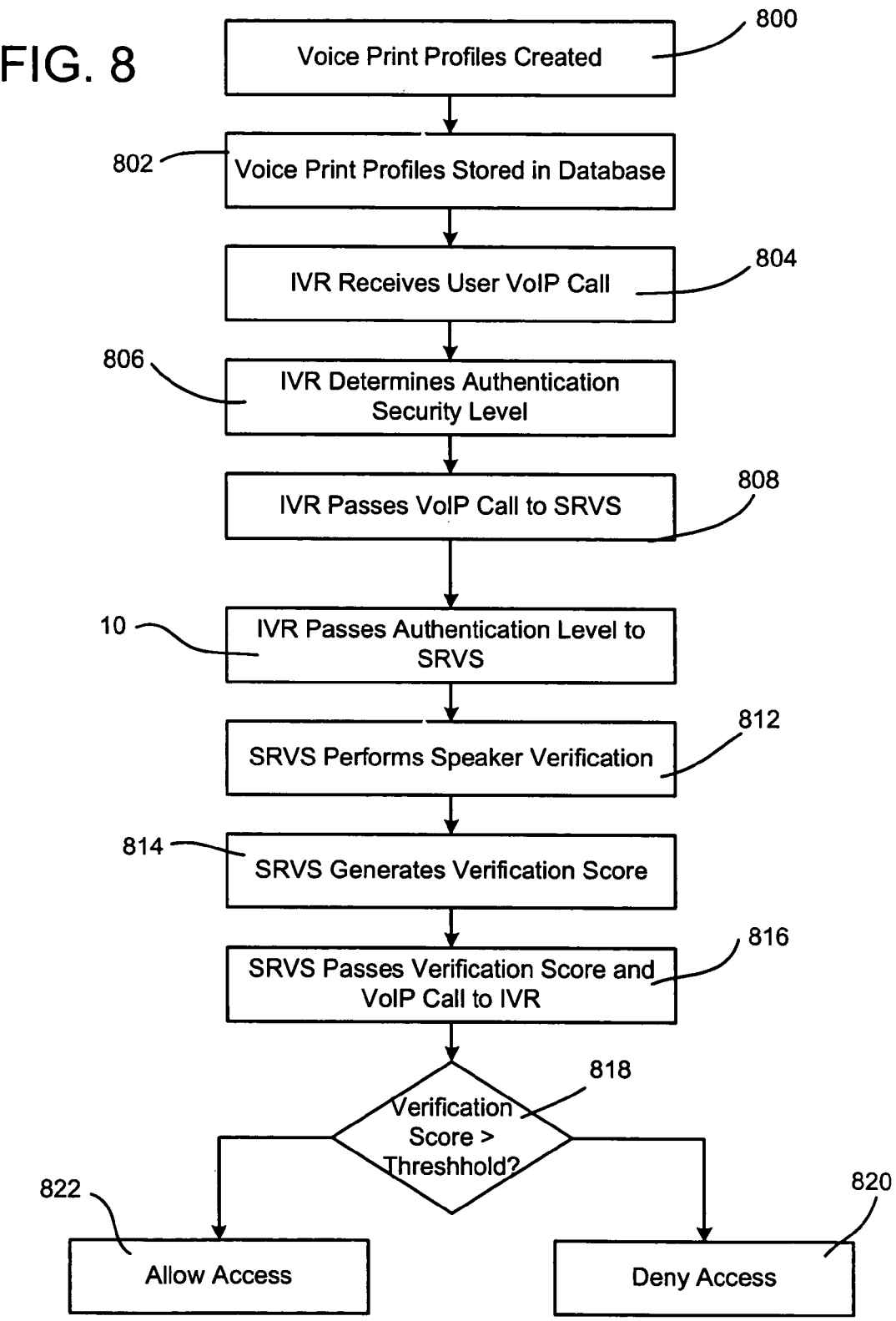

SYSTEMS AND METHODS FOR PROVIDING NETWORK-BASED VOICE AUTHENTICATION

FIELD OF THE INVENTION

The present invention relates generally to speech verification systems and, more particularly, to systems and methods for implementing speech verification systems.

BACKGROUND OF THE INVENTION

Speaker verification is the process of verifying the identity of a speaker based upon an analysis of a sample of his or her speech using previously saved information. In general, speaker verification or authentication consists of making a determination as to whether the identity of a speaker is, in fact, the same as that being claimed. Some applications of speaker verification include, for example, access control for a variety of purposes, such as for telephones, computer networks, databases, bank accounts, credit-card funds, automatic teller machines, building or office entry, etc. Providing automatic verification of a person's identity based upon his or her voice can be implemented more conveniently and in a less costly manner than many other known biometric methods such as, fingerprint analysis or retinal/iris scanning. Further, unlike other biometric solutions, speaker verification is non-intrusive and may be implemented from a remote location. In addition to added convenience, speaker verification of user identity substantially increases security of phone-based communication systems over conventional authentication systems such as those using numeric PIN codes or passwords.

In general, speaker verification is performed based upon previously saved information which, at least in part, represents particular vocal characteristics of the speaker whose identity is to be verified. Specifically, the speech signal which results from a speaker's "test" utterance (i.e., an utterance offered for the purpose of verifying the speaker's identity) is analyzed to extract certain acoustic elements of the speech signal commonly referred to as a voice print. The previously uttered speech which is used for comparison purposes most commonly, but not necessarily, consists of a number of repetitions of the same word or phrase as the one which is to be spoken as the "test" utterance. In any case, the previously uttered speech is referred to as "training" speech, and it is provided to the system as part of an "enrollment" session.

In use, identified acoustic elements extracted a user's input voice signal are compared against the voice print identified from the test utterance. A determination is then made indicating whether the speaker is who they claim to be.

Unfortunately, speaker verification systems proposed to date require significant capital and infrastructure expense on the part of the entity desiring system implementation. In addition to procuring or developing software systems for establishing and comparing voice print data from enrolled participants, the voice prints generated during enrollment of users must be maintained in manner facilitating efficient utilization. Such limitations render speaker verification systems unusable to a wide-variety of otherwise interested entities.

Accordingly, there is a need in the art of speaker verification systems for a speaker verification system which reduces expense and infrastructure requirements for participating entities.

SUMMARY OF THE INVENTION

In accordance with one implementation consistent with the principles of the invention, a system provides voice authentication via a network. The system may include an intelligent voice response engine that may be operatively coupled to the network for receiving transaction or access requests from the plurality of telecommunications devices over the network. A speech recognition and verification services engine may be operatively coupled to the network. A database may be operatively coupled to the speech recognition and verification services engine for storing user voice print profiles. The speech recognition and verification services engine may receive a speaker verification call from the intelligent voice response engine, perform speaker verification on the received speaker verification call based on the stored user voice print profiles, and generate a verification score based upon results of the speaker verification.

In another implementation consistent with the principles of the invention, a system performs speaker verification. The system may include a speech recognition and verification services engine that may be operatively coupled to a first network. A database may be operatively coupled to the speech recognition and verification services engine for storing user voice print profiles. The speech recognition and verification services engine may be configured to: receive a speaker verification call from a voice response engine over the first network; receive an authentication security level associated with the speaker verification call from the voice response engine; perform speaker verification on the received speaker verification call based on the stored user voice print profiles and the authentication security level associated with the speaker verification call; and generate a verification score based upon results of the speaker verification.

In yet another implementation consistent with principles of the invention, there is provided a method for performing speaker recognition over a network. The method may include receiving a call including a transaction or access request from one of a plurality of telecommunications devices over the network. The call may be passed to a speech recognition and verification services engine over the network. The call may be received by the speech recognition and verification services engine. Speaker verification may be performed on the received call based on user voice print profiles. A verification score may be generated based upon results of the speaker verification.

In still another implementation consistent with principles of the invention, there is provided a method for performing speaker verification. The method may include receiving a call from a voice response system over a first network. An authentication security level associated with the call may be received from the voice response system. Speaker verification may be performed on the received call based on stored user voice print profiles and the authentication security level. A verification score may be generated based upon results of the speaker verification.

In another implementation consistent with principles of the invention, a computer-readable medium is provided that contains instructions for performing a method for providing speaker verification over a network. The method may include receiving a call from a first system via the network. Speaker verification may be performed on the received call based on user voice print profiles. A verification score may be generated based upon results of the speaker verification. The verification score may be passed to the first system for access determination.

Other features and advantages of the present invention will become readily apparent to those skilled in this art from the following detailed description. The embodiments shown and described provide illustration of the best mode contemplated for carrying out the invention. The invention is capable of
} modifications in various obvious respects, all without departing from the invention. Accordingly, the drawings are to be regarded as illustrative in nature, and not as restrictive.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 8 is an exemplary flow diagram, consistent with the present invention, illustrating one method for providing a remote speaker verification service using the system of FIG. 7.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide network-based speaker verification. According to one implementation consistent with principles of the invention, an intelligent voice response engine receives users calls and passes them to a third party speech recognition and verification services engine for speaker recognition based on stored user voice profiles. The speech recognition and verification services engine generates a verification score.

Exemplary System

Figure 1:
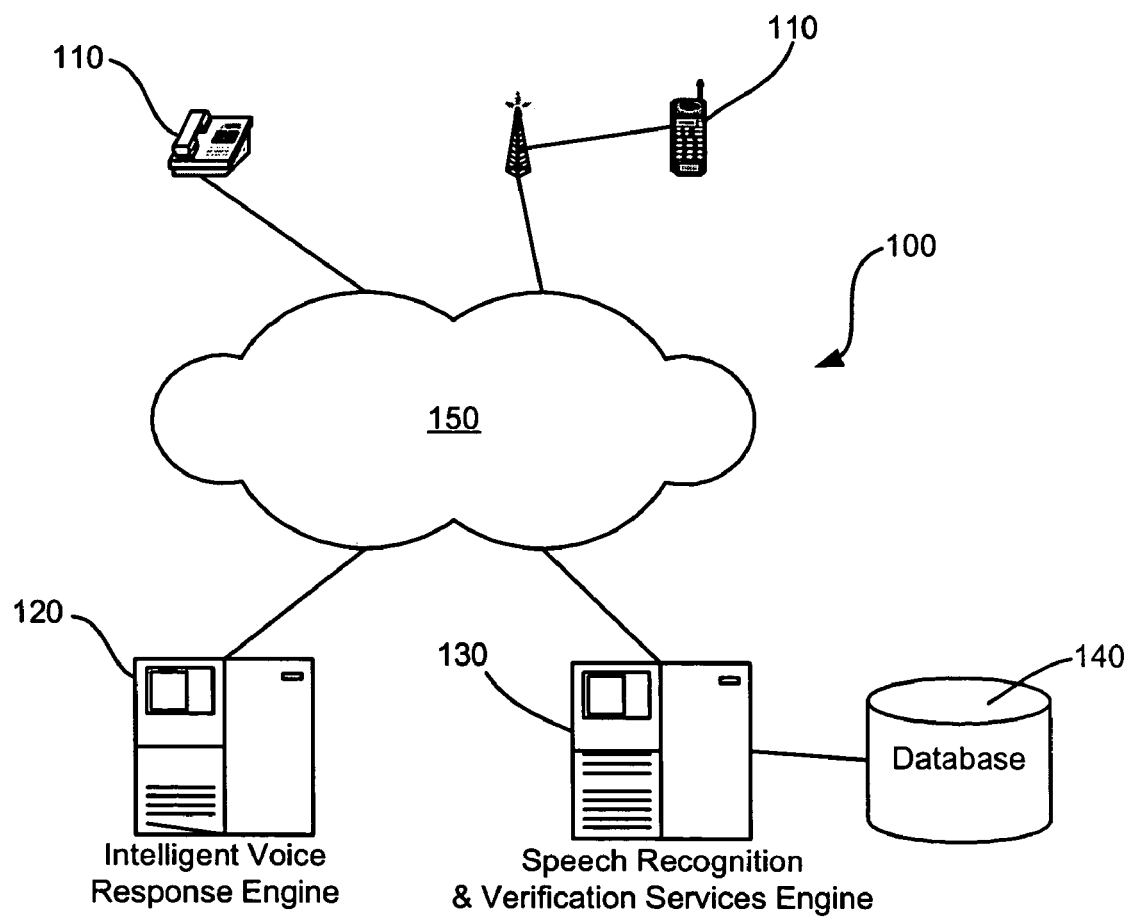
FIG. 1 is a block diagram of an exemplary system in which methods and systems consistent with the present invention may be implemented.

FIG. 1 is a block diagram of an exemplary system 100 in which methods and systems consistent with the present invention may be implemented. System 100 includes a plurality of telecommunications devices 110, an intelligent voice response (IVR) engine 120, a speech recognition and verification services (SRVS) engine 130, a database 140 and a network 150.

Network 150 may include any combination of known network portions, including, but not limited to: a wireline telecommunications network (i.e., the Public Switched Telephone Network or PSTN), one or several wireless telecommunications networks operating with know protocols, e.g., Time Division Multiple Access (TDMA), Code Division Multiple Access (CDMA), Global System for Mobile Communications (GSM), Multi-Point Microwave Distribution System (MMDS), etc., and may also comprise an Internet Protocol (IP)-based packet-switched network (PSN) portion for providing Voice over IP (VoIP) telephony., e.g., an H.323 network or a Session Initiation Protocol (SIP) network, or the Internet. Those skilled in the art should further appreciate that network 150 is illustrative and inclusive of any proprietary or customized operator networks used for data transport, e.g., Local Area Networks (LANs), Wide Area Networks (WANs), Metropolitan Area Networks (MANs), Personal Area Networks (PANs), Ethernet portions, Token Ring portions, etc., which interconnect various nodes and equipment used for effectuating the invention.

Additionally, telecommunications devices 110 may include, but are not limited to, POTS (Plain Old Telephone Service) wireline telephones, wireless network telephones (e.g., CDMA, TDMA, GSM, etc.), Internet telephones, SIP phones, H.323 terminals, Information Appliances, mobile stations, personal computers including Telephony Application Programming Interfaces (TAPIs), etc.

In an exemplary implementation, IVR engine 120 is associated with an enterprise caller third party not otherwise affiliated with the SRVS engine 130, each of which is operatively connected to each other and with the plurality of telecommunications devices 110 by network 150. In one embodiment, the enterprise caller third party may be a bank or other financial institution. However, it should be understood that any suitable enterprise requiring voice authentication of callers may be associated with IVR engine 120. As will be discussed in additional detail below, in one implementation consistent with principles of the invention, the enterprise caller third party wishes to authenticate callers into their existing IVR applications with multiple different security levels (e.g., low, medium, and high). Additionally, in one implementation, SRVS engine 130 provides speaker verification services in response to requests from IVR engine 120. Such services may be performed in any suitable manner using the voice profiles stored in database 140. Furthermore, it should be understood that, although FIG. 1 illustrates a single IVR engine 120 and SRVS engine 130 connected by network 150, in alternate implementations, these devices may be directly connected or may comprise a single device/system.

Exemplary Processing

Figure 2:
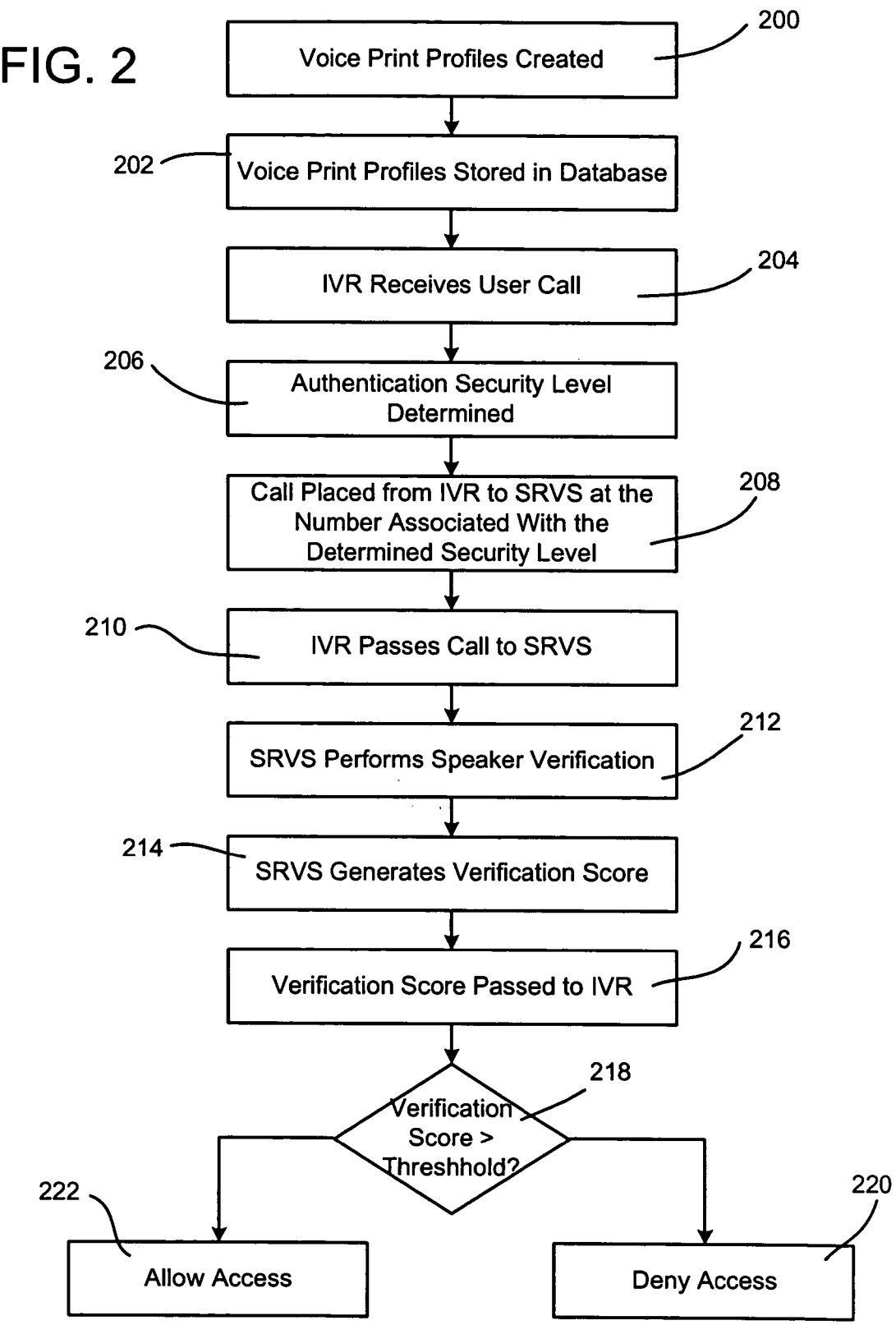
FIG. 2 is an exemplary flow diagram, consistent with the present invention, illustrating one method for providing a remote speaker verification service using the system of FIG. 1.

FIG. 2 is an exemplary flow diagram, consistent with the present invention, illustrating one method for providing a remote speaker verification service using system 100. Initially, during an enrollment process, a voice print profile is created or configured for each system user, either online or offline, by obtaining a plurality of voice samples related to each user (act 200). In one implementation, the voice samples may comprise voice responses provided by users in response to questions that the user is required to answer or phrases that the user is required to repeat during the enrollment process. Preferably, the voice print profile may be defined via a menu of selectable and/or prompted options that require input such as: repeated phrases, user's name, favorite hobby, etc. Once received, the responses making up each voice print profile are then stored in database 140 (act 202) for subsequent retrieval and comparison. Once users have been enrolled, the saved voice prints are available for use in authenticating users via any suitable telecommunications system (e.g., land line telephone, hands-free telephone, IP (Internet Protocol) telephone, mobile (e.g., cellular, etc.) telephone, etc.).

Next, assume IVR engine 120 receives a call from a user to perform a desired transaction (e.g., financial transfer, information retrieval, etc.) over network 150 (act 204). In response to user inputs (e.g., voice responses, DTMF (dual tone multifrequency) tones, etc.) into IVR engine 120, an authentication security level is determined for the desired transaction (act 206). For example, in a financial setting, if a user wishes to transfer money from one account to another, a higher security level may be required than if the user simply wants to review current balance or payment information. In one embodiment, IVR engine 120 and SRVS engine 130 together support three distinct security levels, although any suitable number of security levels may be embodied in the present invention.

In accordance with one implementation consistent with principles of the invention, SRVS engine 130 supports three distinct incoming call numbers associated with the third Party's three security levels. Accordingly, IVR engine 120 calls SRVS engine 130 at a number associated with the authentication security level identified in act 206 (act 208). Alternatively, one number may be used and IVR engine 120 may transmit a security level indicator with the call. Upon connection, IVR engine 120 passes the user call through to SRVS engine 130 for speaker verification (act 210). In one implementation consistent with principles of the invention, the IVR engine 120 remains in the call path so as to be responsive to DTMF tones generated by the SRVS engine 130 upon completion of the speaker verification process.

SRVS engine 130 then performs speaker verification of the caller at a level commensurate with the previously identified authentication security level (act 212). In one implementation this may include querying the caller to answer questions corresponding to the questions asked during voice print profile creation. Alternatively, the caller may be asked to repeat requested phrases. It should be understood that the specific manner of speaker verification or authentication may incorporate any known verification techniques, such as passcode or password repetition, random utterances, etc.

Once SRVS engine 130 has performed its verification, it calculates or otherwise generates a verification score or other type of verification result relating to the certainty or probability that the caller is as asserted (act 214). Next, the verification score is passed to IVR engine 120 for use in determining access for the desired action (act 216). In one embodiment consistent with principles of the invention, the verification score is passed from SRVS engine 130 to IVR engine 120 via the previously established call path by DTMF tones. For example, simple combinations of DTMF tones representative of the SRVS engine's verification certainty (e.g., tones "00" to "99") may be passed as a verification score in act 216.

Once the verification score has been passed from SRVS engine 130 to IVR engine 120, IVR engine 120 determines whether the received score meets or exceeds a predetermined value associated with the desired transaction or identified authentication level (act 218). If not, the caller is notified that voice verification has failed (act 220). In one implementation consistent with principles of the invention, the caller is returned to an initial menu of options initially available upon call receipt by IVR engine 120. If the received verification score does meet or exceed a predetermined value associated with the desired transaction or identified authentication level, IVR engine 120 continues with the requested transaction in any suitable manner (act 222).

Figure 3:
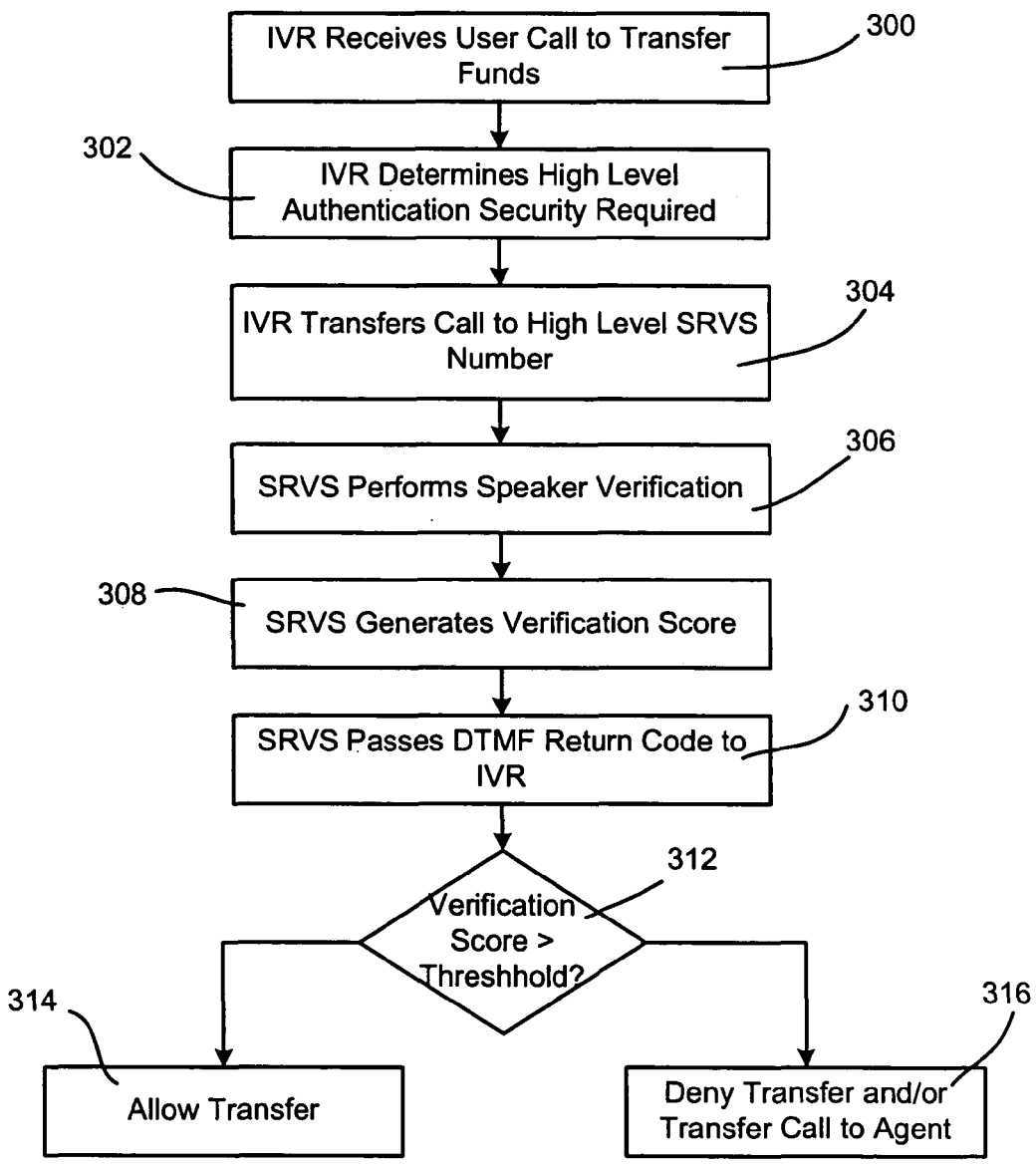
FIG. 3 illustrating one example of a call flow wherein a previously enrolled banking customer wishes to transfer funds.

FIG. 3 is an exemplary flow diagram, consistent with the present invention, illustrating one example of a call flow wherein a previously enrolled banking customer, wishes to transfer a relatively large amount of funds, e.g., $10,000. Initially, assume that the caller calls IVR engine 120 and requests to transfer $10,000 (act 300). In response, IVR engine 120 first determines that the requested transaction requires a High level of voice authentication (act 302). Next, IVR engine 120 transfers the call to a High Security SRVS telephone number associated with SRVS engine 130 (act 304). In the present example, IVR engine 120 remains in the call path listening for DTMF tones. Upon receipt of the call, SRVS engine 130 performs speaker verification of the caller's voice (act 306) and determines a verification score (act 308).

Once the verification score has been determined, it is converted to a percentage corresponding to an in-band DTMF return code relating to the determined level of authentication. In the present example, assume that the caller's verification score has been determined to be 78. Accordingly, SRVS generates a DTMF "78" return code for receipt by IVR engine 120 (act 310). Next, IVR engine 120 resumes call control and determines whether the received score is sufficient to enable the requested transfer (act 312). If so, IVR engine proceeds to process the requested transfer (act 314). However, if the received verification score is not sufficient to enable immediate processing of the requested transaction, the caller may be transferred to a live agent for further security verification or the funds transfer may be simply denied (act 316).

Figure 4:
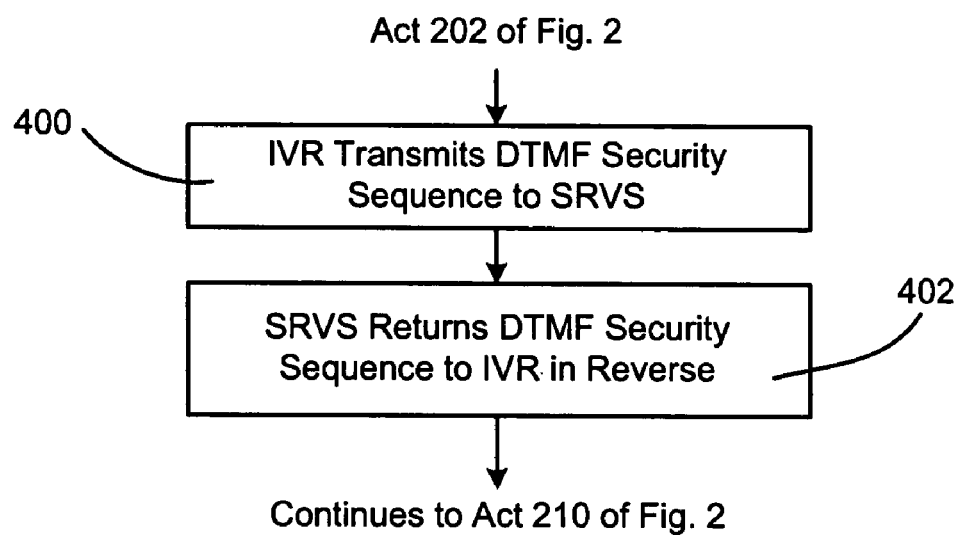
FIG. 4 is an exemplary flow diagram, consistent with the present invention, illustrating one example of a method for enhancing security between the IVR engine and the SRVS engine of FIG. 1.

Referring now to FIG. 4, there is shown an exemplary flow diagram, consistent with the present invention, illustrating one example of a method for enhancing security between IVR engine 120 and SRVS engine 130. In accordance with this implementation, special information may be exchanged between IVR engine 120 and SRVS engine 130 prior to the IVR engine's connecting (cutting thru) the caller's voice path to the SRVS engine 130. More particularly, SRVS engine 130 initially answers a call from IVR engine 120 (prior to cut thru of voice path) (act 210 of FIG. 2). At this point, IVR engine 120 may transmit a DTMF security sequence to SRVS engine 130 (act 400). In response, SRVS engine transmits the received DTMF sequence in reverse back to IVR engine 120 (act 402). The voice path may then be connected (act 210 of FIG. 2) and the call proceeds as described above in FIG. 2.

Out of Band IVR/SRVS Connection

Figure 5:
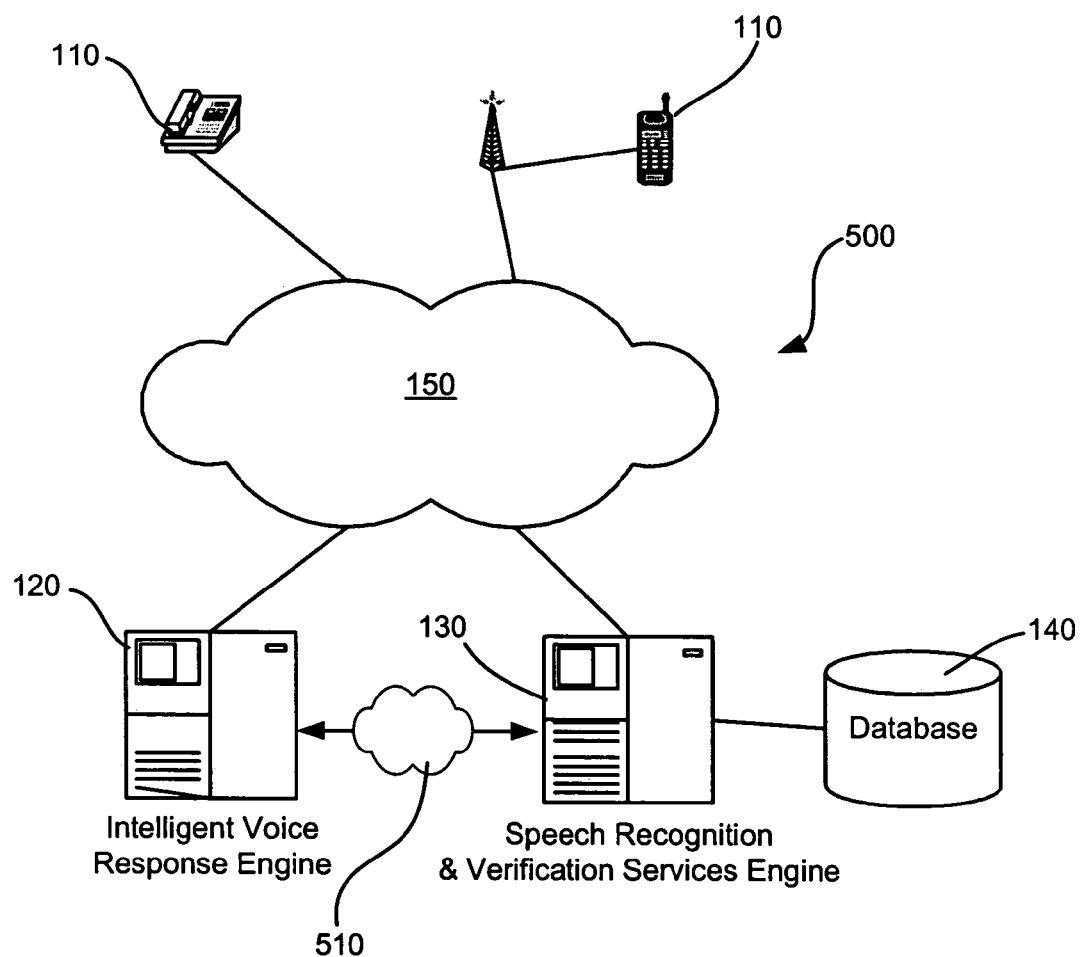
FIG. 5 is a block diagram of another exemplary system in which methods and systems consistent with the present invention may be implemented.

FIG. 5 is a block diagram of another exemplary system 500 in which methods and systems consistent with the present invention may be implemented. System 500 includes a plurality of telecommunications devices 110, an IVR engine 120, a SRVS engine 130, a database 140, a first network 150 and a second network 510.

As described above, network 150, as well as newly described network 510, may include any combination of known network portions. Additionally, it should be understood that, although networks 150 and 510 are illustrated as separate networks, these networks may be implemented as a single network in which different network connections or connection types may be implemented so as to enable parallel communications channels to be established.

In the present implementation, IVR engine 120 is again associated with an enterprise caller third party not otherwise affiliated with SRVS engine 130 as described in FIG. 1. Each of the IVR engine 120 and SRVS engine 130 are operatively connected to each other and with the plurality of telecommunications devices 110 by first network 150 and second network 510. The connection between IVR engine 120 and SRVS engine 130 via network 510 may represent an out of band interface with respect to a connection between IVR engine 120 telecommunications device 110 and SRVS engine 130 via network 150. As with the embodiments described above, assume that the enterprise caller third party wishes to authenticate callers into their existing IVR applications with multiple different security levels (e.g., low, medium, and high).

Figure 6:
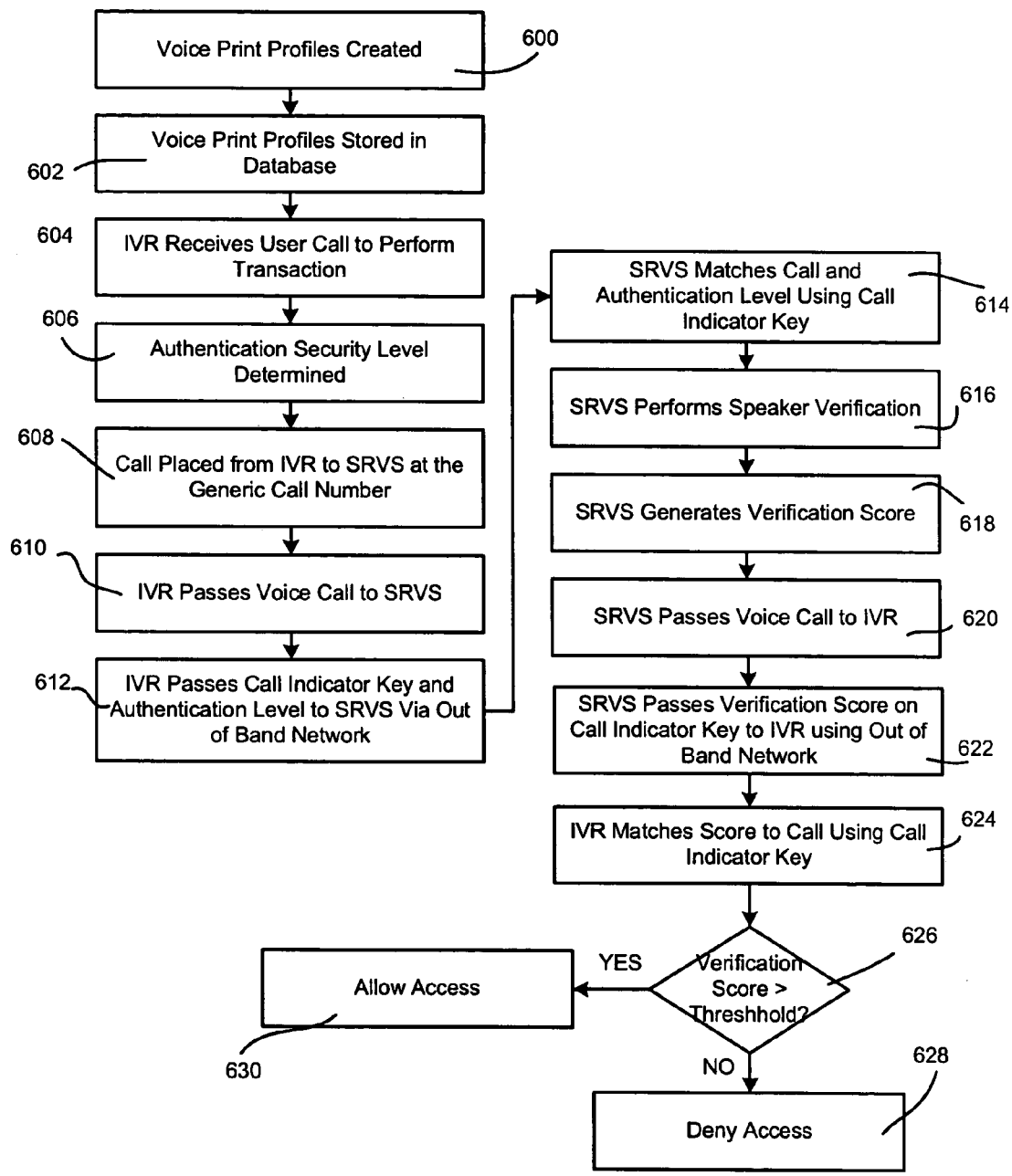
FIG. 6 is an exemplary flow diagram, consistent with the present invention, illustrating one method for providing a remote speaker verification service using the system of FIG. 5.

FIG. 6 is an exemplary flow diagram, consistent with the present invention, illustrating one method for providing a remote speaker verification service using system 500. Initially, during an enrollment process, a voice print profile is created or configured for each system user, either online or offline, by obtaining a plurality of voice samples related to each user in the manner described above (act 600). Once received, the responses making up each voice print profile are then stored in database 140 (act 602) for subsequent retrieval and comparison. Once users have been enrolled, the saved voice prints are available for use in authenticating users via any telecommunications system (e.g., land line telephone, hands-free telephone, IP (Internet Protocol) telephone, mobile (e.g., cellular, etc.) telephone, etc.).

Next, IVR engine 120 receives a call from a user to perform a desired transaction (e.g., financial transfer, information retrieval, etc.) over network 150 (act 604). In response to user inputs (e.g., voice responses, DTMF (dual tone multifrequency) tones, etc.) into IVR engine 120, an authentication security level is determined for the desired transaction (act 606). In one embodiment, IVR engine 120 and SRVS engine 130 together support three distinct security levels, although any suitable number of security levels may be embodied in the present invention.

In accordance with one implementation consistent with principles of the invention, SRVS engine 130 supports a single generic call number associated with IVR engine 120 requests. Accordingly, IVR engine 120 next calls SRVS engine 130 at its generic call number (act 608). Upon connection, IVR engine 120 passes the user call and a Call Indicator Key through to SRVS engine 130 for speaker verification (act 610). As will be described below, the Call Indicator Key enables SRVS engine 130 to associate the passed voice call with additional context information received via out of band network 510. In one implementation consistent with principles of the invention, the Call Indicator Key may include PSTN signaling. For example, the last four digits of the call ANI (automatic number identification) may be transmitted via PSTN signaling. As the voice call is being passed to SRVS engine 130 (act 610), IVR engine 120 also transmits the Call Indicator Key and an authentication level associated with the call to SRVS engine 130 using out of band network 510 (act 612). In one implementation consistent with principles of the invention, out of band network 510 is a packet-based network that supports the secure hypertext transfer protocol (HTTPS).

SRVS engine 130 then matches the out of band authentication level information received in act 612 with the voice call received in act 610 using the Call Indicator Key (act 614). SRVS engine next performs speaker verification of the caller at a level commensurate with the received authentication level (act 616). In one implementation, this may include querying the caller to answer questions corresponding to the questions asked during voice print profile creation. Once SRVS engine 130 has performed its verification, it calculates or otherwise generates a verification score or other type of verification result relating to the certainty or probability that the caller is as asserted (act 618). Next, SRVS engine 130 passes the voice call back to IVR engine 120 (act 620) and transmits the Call Indicator Key and verification score to IVR engine 120 via the out of band network 510 (act 622).

Once the verification score has been passed from SRVS engine 130 to IVR engine 120, IVR engine 120 matches the received score with the voice call using the Call Indicator Key (act 624). Next, IVR engine 120 determines whether the received score meets or exceeds a predetermined value associated with the desired transaction or identified authentication level (act 626). If not, the caller is notified that voice verification has failed (act 628) and/or the caller is queried regarding further authentication procedures (i.e., human interaction). If the received verification score does meet or exceed a predetermined value associated with the desired transaction or identified authentication level, IVR engine 120 continues with the requested transaction in any suitable manner (act 630).

Voice Over IP Implementation

Figure 7:
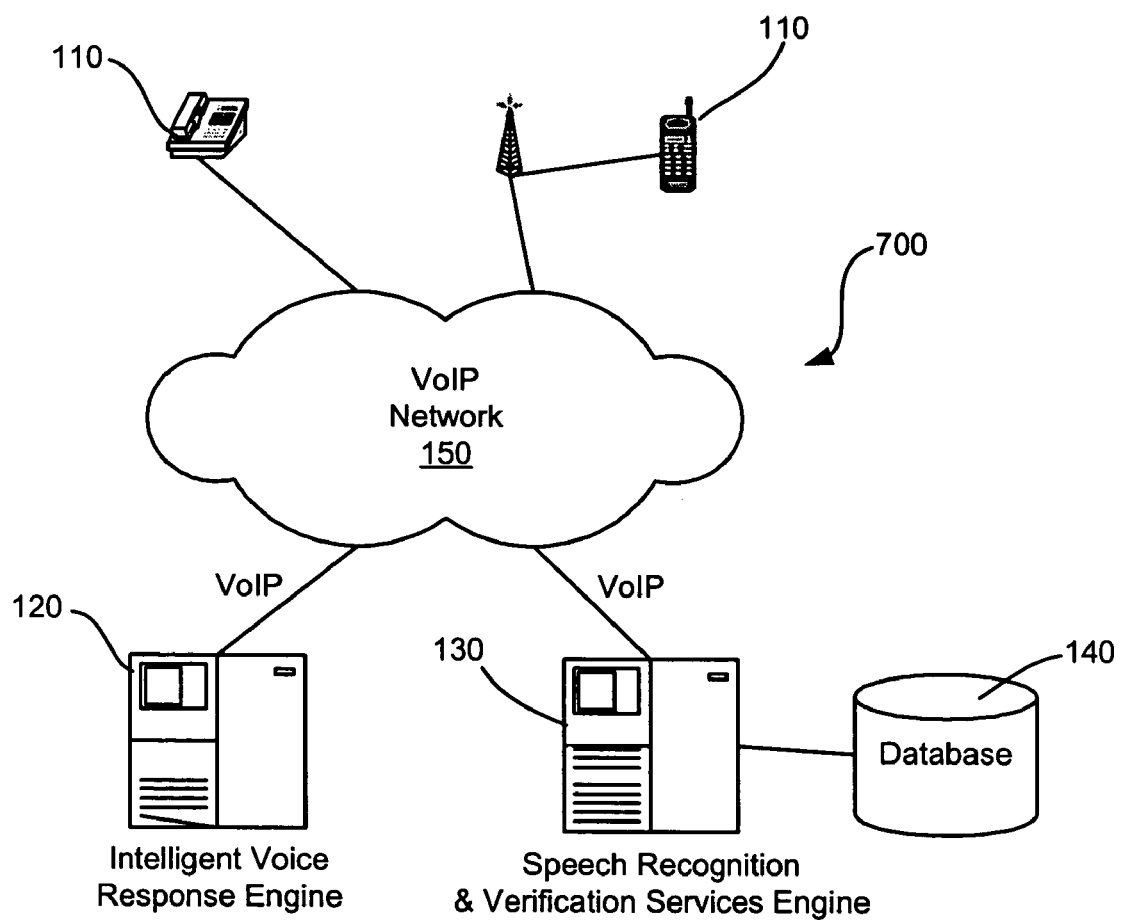
FIG. 7 is a block diagram of yet another exemplary system in which methods and systems consistent with the present invention may be implemented.

FIG. 7 is a block diagram of another exemplary system 700 in which methods and systems consistent with the present invention may be implemented. System 700 includes a plurality of telecommunications devices 110, an IVR engine 120, a SRVS engine 130, a database 140, and a network 150.

In accordance with the present implementation, network 150 may include any Internet Protocol (IP)-based packet-switched network (PSN) portion for providing Voice over IP (VoIP) telephony., e.g., an H.323 network or a Session Initiation Protocol (SIP) network, or the Internet. Those skilled in the art should further appreciate that network 150 is illustrative and inclusive of any proprietary or customized operator networks used for data transport, e.g., Local Area Networks (LANs), Wide Area Networks (WANs), Metropolitan Area Networks (MANs), Personal Area Networks (PANs), Ethernet portions, Token Ring portions, etc., which interconnect various nodes and equipment used for effectuating the invention.

In this implementation, assume IVR engine 120 remains associated with an enterprise caller third party not otherwise affiliated with SRVS engine 130 as described in FIG. 1. Each of the IVR engine 120 and SRVS engine 130 are operatively connected to each other and with the plurality of telecommunications devices 110 by network 150. As with the embodiments described above, the enterprise caller third party wishes to authenticate callers into their existing IVR applications with multiple different security levels (e.g., low, medium, and high).

FIG. 8 is an exemplary flow diagram, consistent with the present invention, illustrating one method for providing a remote speaker verification service using system 700. Initially, during an enrollment process, a voice print profile is created or configured for each system user, either online or offline, by obtaining a plurality of voice samples related to each user in the manner described above (act 800). Once received, the responses making up each voice print profile are then stored in database 140 (act 802) for subsequent retrieval and comparison. Once users have been enrolled, the saved voice prints are available for use in authenticating users via any microphone-based telecommunications system (e.g., land line telephone, hands-free telephone, IP (Internet Protocol) telephone, mobile (e.g., cellular, etc.) telephone, etc.).

Next, IVR engine 120 receives a call from a user to perform a desired transaction (e.g., financial transfer, information retrieval, etc.) over VoIP network 150 (act 804). In response to user inputs (e.g., voice responses, DTMF (dual tone multifrequency) tones, etc.) into IVR engine 120, an authentication security level is determined for the desired transaction (decision block 806). In one embodiment, IVR engine 120 and SRVS engine 130 together support three distinct security levels, although any suitable number of security levels may be embodied in the present invention.

In accordance with one implementation consistent with principles of the invention, IVR engine 120 transmits the caller's VoIP call to SRVS engine 130 using the real time protocol (RTP) (act 808). Upon establishing a connection, IVR engine 120 simultaneously passes an authentication level associated with the call to SRVS engine 130 as data via Session Initiation Protocol (SIP) (act 810).

SRVS engine 130 then performs speaker verification of the caller at a level commensurate with the received authentication level (act 812). In one implementation this may include querying the caller to answer questions corresponding to the questions asked during voice print profile creation. Once SRVS engine 130 has performed its verification, it calculates or otherwise generates a verification score or other type of verification result relating to the certainty or probability that the caller is as asserted (act 814). Next, SRVS engine 130 passes the VoIP call back to IVR engine 120 as well as its generated verification score (act 816) via SIP data.

Once the verification score has been passed from SRVS engine 130 to IVR engine 120, IVR engine 120 determines whether the received score meets or exceeds a predetermined value associated with the desired transaction or identified authentication level (act 818). If not, the caller is notified that voice verification has failed (act 820) and/or the caller is queried regarding further authentication procedures (i.e., human interaction). If the received verification score does meet or exceed a predetermined value associated with the desired transaction or identified authentication level, IVR engine 120 continues with the requested transaction in any suitable manner (act 822).

CONCLUSION

Implementations consistent with the principles of the invention provide organizations with an efficient and effective means for performing speaker verification.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while series of acts have been described with regard to FIGS. 2-4, 6 and 8, the order of the acts may be varied in other implementations consistent with the present invention. Moreover, non-dependent acts may be implemented in parallel.

It will also be apparent to one of ordinary skill in the art that aspects of the invention, as described above, may be implemented in many different forms of software, firmware, and hardware. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A system for providing voice authentication via a network, comprising:
a voice response system operatively coupled to the network for receiving transaction or access requests from a plurality of telecommunications devices over the network;
a speech recognition and verification services engine operatively coupled to the network; and
a memory operatively coupled to the speech recognition and verification services engine for storing user voice print profiles,
where the voice response system is to:
receive a request from a telecommunications device of the plurality of telecommunications devices,
determine, based on the received request, an authentication security level, out of a plurality of candidate authentication security levels, for the request, and
place a speaker verification call, after receiving the request and determining the authentication security level, to the speech recognition and verification services engine using a particular access number, the particular access number being selected based on the determined authentication security level,
where the speech recognition and verification services engine is to:
receive the speaker verification call from the voice response system,
perform speaker verification on the received speaker verification call based on the stored user voice print profiles, and
generate a verification score based upon results of the speaker verification.

2. The system of claim 1, where the speech recognition and verification services engine passes the verification score to the voice response system.

3. The system of claim 2, where the voice response system determines whether the transaction or access should be allowed based upon the received verification score and the determined authentication security level.

4. The system of claim 2, where the speech recognition and verification services engine passes the speaker verification call to the voice response system following generating of the verification score.

5. The system of claim 1, where the network is a Public Switched Telephone Network (PSTN).

6. The system of claim 5, where the voice response system remains in a call path following placing of the speaker verification call to the speech recognition and verification services engine.

7. The system of claim 5, where the speech recognition and verification services engine passes the verification score to the voice response system via discrete multitone frequency (DTMF) tones.

8. The system of claim 1, where the speech recognition and verification services engine is associated with a party not affiliated with the voice response system.

9. The system of claim 1, where the voice response system determines an authentication security level for each transaction or access request received.

10. The system of claim 1, where the speech recognition and verification services engine is associated with three distinct access numbers associated with three authentication security levels.

11. The system of claim 9, where the network is a packet switched network (PSN), and calls between the plurality of telecommunication devices and the voice response system are voice over Internet Protocol (VoIP) calls.

12. The system of claim 11, where
the speech recognition and verification services engine receives the speaker verification call and the authentication security level from the voice response system; and
the speech recognition and verification services engine performs speaker verification based upon the determined authentication security level.

13. The system of claim 12, where
the speaker verification call is passed to the speech recognition and verification services engine using real time protocol (RTP); and
the authentication security level is passed to the speech recognition and verification services engine via Session Initiation Protocol (SIP).

14. The system of claim 9, where the verification score is passed from the speech recognition and verification services engine to the voice response system via Session Initiation Protocol (SIP).

15. The system of claim 1, where the particular access number is selected from a plurality of candidate access numbers.

16. A system for performing speaker verification, comprising:
a speech recognition and verification services engine operatively coupled to a first network; and
a memory, operatively coupled to the speech recognition and verification services engine, to store user voice print profiles,
where the speech recognition and verification services engine is to:
receive a speaker verification call from a voice response engine over the first network;
receive an authentication security level and a call indicator key associated with the speaker verification call from the voice response engine, the authentication security level being determined by the speech recognition engine before the speech recognition and verification services engine receives the authentication security level, where the authentication security level is one of a plurality of candidate authentication security levels;
perform speaker verification on the received speaker verification call based on the stored user voice print profiles and the authentication security level associated with the speaker verification call;
generate a verification score based upon results of the speaker verification; and
match the verification score to the call using the call indicator key.

17. The system of claim 16, where the first network is a Public Switched Telephone Network (PSTN).

18. The system of claim 16, where the speech recognition and verification services engine receives the authentication security level over a packet switched network.

19. The system of claim 16, where the speech recognition and verification services engine passes the verification score to the voice response engine via a second network.

20. The system of claim 16, where
the voice response engine passes the authentication security level and the call indicator key associated with the speaker verification call to the speech recognition and verification services engine via a second network; and
the speech recognition and verification services engine matches the received authentication security level with the speaker verification call using the call indicator key.

21. The system of claim 20, where
the speech recognition and verification services engine passes the verification score and the call indicator key to the voice response engine via the second network.

22. A method comprising:
receiving, at a network device, a call that includes a transaction or access request from one of a plurality of telecommunications devices over a first network;
passing the call to a speech recognition and verification services engine over the first network;
transmitting a call indicator key and an authentication level to the speech recognition and verification services engine over a second network, the second network being different than the first network;
receiving the call, over the first network, and the call indicator key, over the second network, by the speech recognition and verification services engine;
performing speaker verification on the received call based on user voice print profiles and the authentication level;
generating a verification score based upon results of the speaker verification;
transmitting, by the speech recognition and verification services engine, the call indicator key and the verification score to the network device;
matching, by the network device, the verification score to the call using the call indicator key; and
one of permitting the request or denying the request based on the verification score.

23. The method of claim 22, where the first network is the Public Switched Telephone Network (PSTN).

24. The method of claim 22, where transmitting the verification score includes:
transmitting the verification score via discrete multitone frequency (DTMF) tones.

25. The method of claim 22, comprising:
determining, by the network device, that the authentication security level is associated with the call, where the authentication security level is one of a plurality of authentication security levels.

26. The method of claim 25, comprising:
calling, by the network device, the speech recognition and verification services engine at an access number associated with the determined authentication security level.

27. The method of claim 25, where at least one of the first and second networks is a packet switched network (PSN), and where the call between the one of the plurality of telecommunication devices and the entity receiving the call is a voice over Internet Protocol (VoIP) call.

28. The method of claim 22, further comprising:
passing the call to the speech recognition and verification services engine using real time protocol (RTP); and passing the authentication security level to the speech recognition and verification services engine via Session Initiation Protocol (SIP).

29. A method for performing speaker verification, comprising:
- receiving a call from a voice response system over a first network;
- receiving an authentication security level and a call indicator key associated with the call from the voice response system, where the received authentication security level is one of a plurality of candidate authentication security levels, and is determined by the voice response system before the authentication security level is received from the voice response system;
- performing speaker verification on the received call based on stored user voice print profiles and the authentication security level;
- generating a verification score based upon results of the speaker verification; and
- matching the verification score to the call using the call indicator key.

30. The method of claim 29, where the first network is a Public Switched Telephone Network (PSTN) and the authentication security level is received via a packet switched network.

31. The method of claim 29, further comprising:
- passing the verification score to the voice response system via a second network that is different from the first network.

32. The method of claim 29, further comprising:
- passing the verification score and the call indicator key to the voice response system via a second network, the second network being different than the first network.

33. A non-transitory computer-readable medium comprising instructions for controlling one or more processors to perform a method for performing speaker verification over a network, the method comprising:
- receiving a call, an authentication security level associated with the call, and a call indicator key associated with the call from a voice response system via the network, where the authentication security level is one of a plurality of candidate authentication security levels;
- performing speaker verification on the received call based on user voice print profiles and based on the received authentication security level;
- generating a verification score based upon results of the speaker verification;
- passing the call indicator key and the verification score to the voice response system for access determination after performing the speaker verification and generating the verification score; and
- matching the verification score to the call using the call indicator key.

* * * * *